No. 740,908. PATENTED OCT. 6, 1903.
A. PATSCHKE.
ROTARY MOTOR.
APPLICATION FILED JULY 22, 1902.
NO MODEL. 4 SHEETS—SHEET 1.

Witnesses:
N. L. Boga[?]
[signature]

Inventor
Arthur Patschke
By James L. Norris
Att'y

No. 740,908. PATENTED OCT. 6, 1903.
A. PATSCHKE.
ROTARY MOTOR.
APPLICATION FILED JULY 22, 1902.

NO MODEL. 4 SHEETS—SHEET 2.

Witnesses:
N. C. Bogan
J. B. Keefe

Inventor:
Arthur Patschke
By James L. Norris
Att'y

THE NORRIS PETERS CO., PHOTO-LITHO., WASHINGTON, D. C.

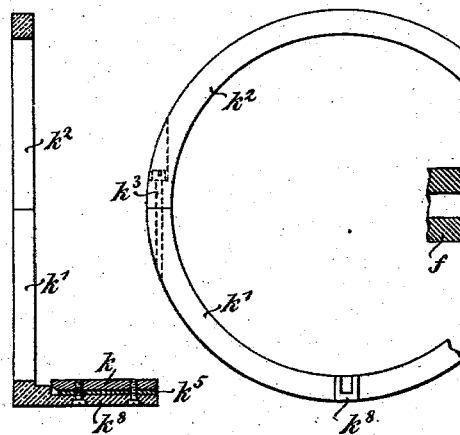
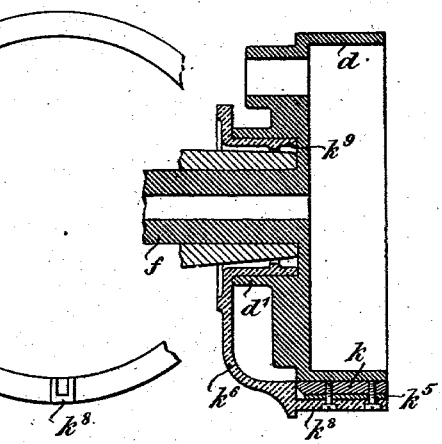
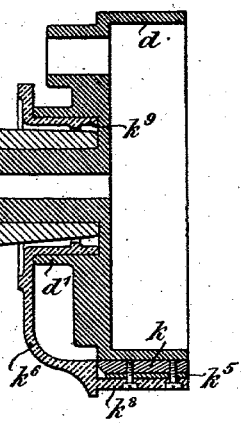
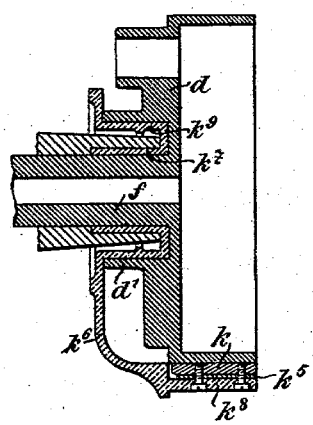
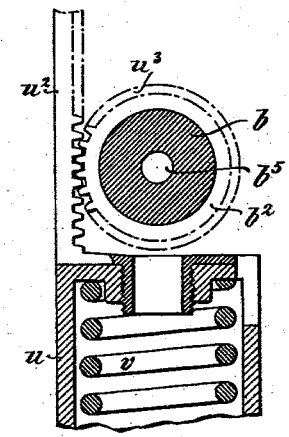

No. 740,908. PATENTED OCT. 6, 1903.
A. PATSCHKE.
ROTARY MOTOR.
APPLICATION FILED JULY 22, 1902.
NO MODEL. 4 SHEETS—SHEET 4.

Witnesses:
James L. Norris
L. B. Keefer

Inventor
Arthur Patschke
By
James L. Norris
Atty.

No. 740,903. Patented October 6, 1903.

UNITED STATES PATENT OFFICE.

ARTHUR PATSCHKE, OF MÜLHEIM-ON-THE-RUHR, GERMANY.

ROTARY MOTOR.

SPECIFICATION forming part of Letters Patent No. 740,908, dated October 6, 1903.

Application filed July 22, 1902. Serial No. 116,591. (No model.)

*To all whom it may concern:*

Be it known that I, ARTHUR PATSCHKE, mechanical engineer, a subject of the Emperor of Germany, residing at Mülheim-on-the-Ruhr, Rhenish Prussia, in the Empire of Germany, have invented certain new and useful Improvements Relating to Rotary Motors, of which the following is a specification.

This invention relates to rotary motors.

The object of the invention is to increase the speed, power, and efficiency of motors.

A further object is to simplify and improve the construction.

With the above and other objects in view, which will be apparent from the accompanying illustrations and following description, the invention resides in the combination of a rotary piston, a turbine, and means for operating said piston and turbine.

The invention further resides in the particular assemblage of parts illustrated and described, though I do not limit myself to the specific embodiment of the invention disclosed except as defined by the following claims.

One embodiment of the invention is illustrated in the accompanying drawings, in which—

Figure 1:
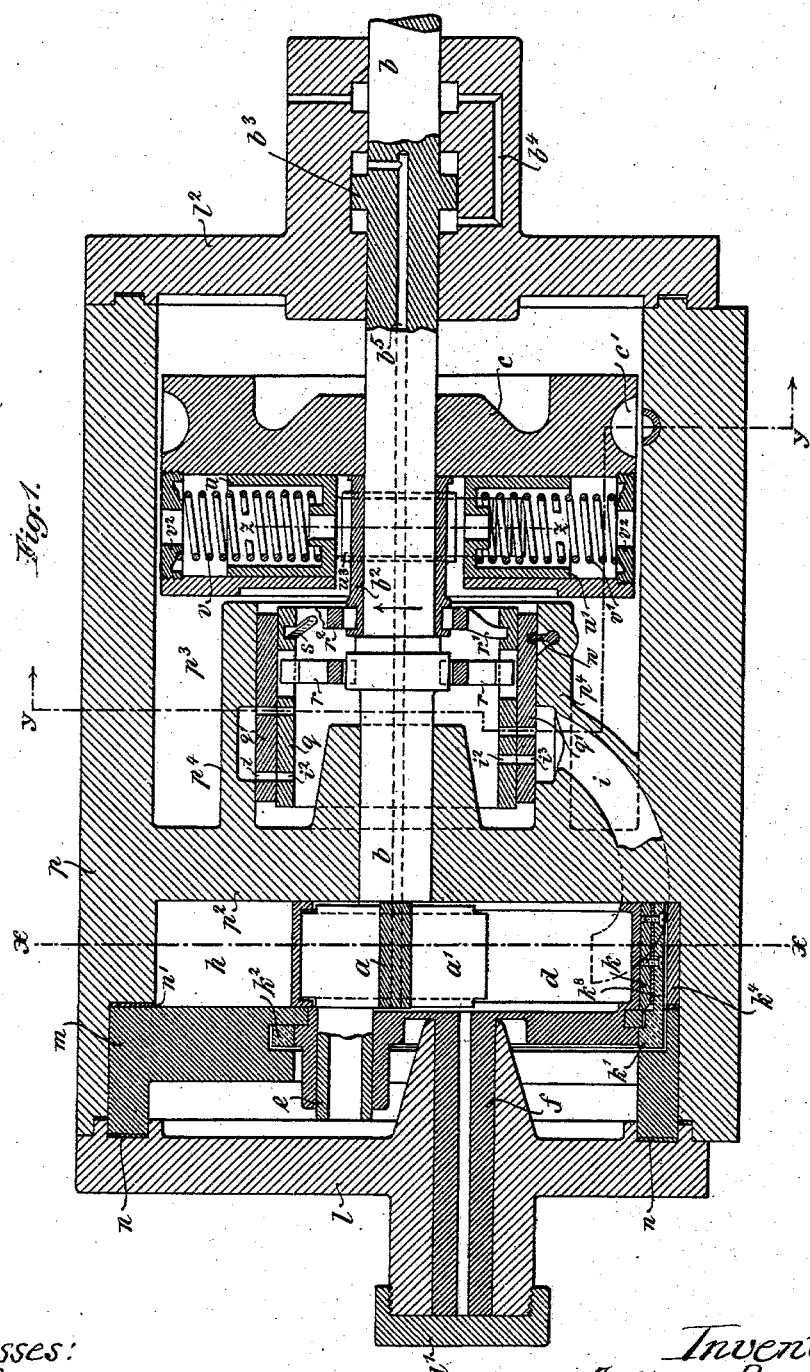
Figure 2:
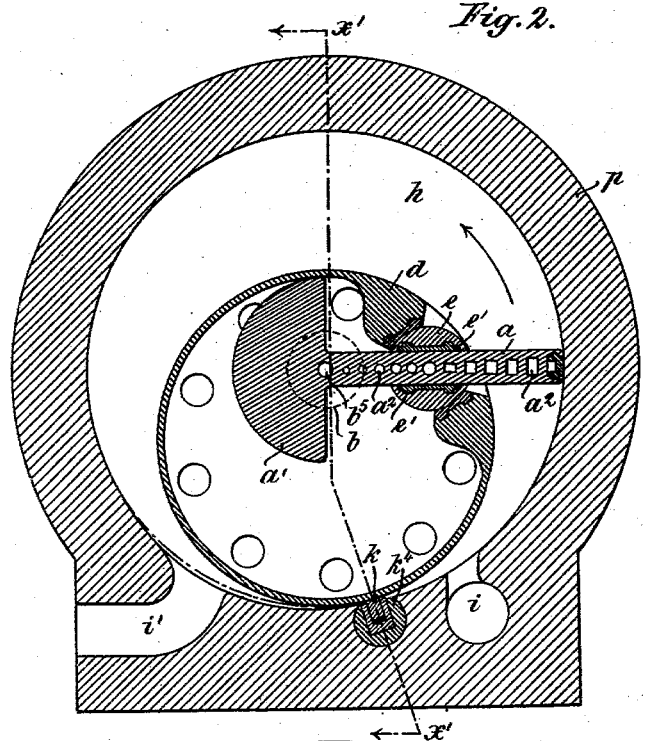
Figure 3:
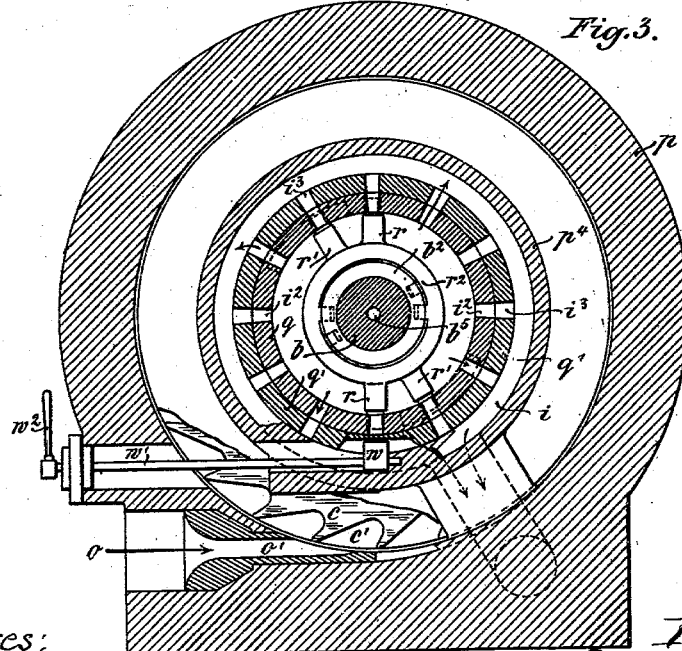

Figure 1 is a vertical section through the machine, partly on the line $x'\,x'$ of Fig. 2. Fig. 2 is a section through the cylinder, piston, and drum on the line $x\,x$ of Fig. 1. Fig. 3 is a section on the line $y\,y$ of Fig. 1. Fig. 4 shows the ring mounted around the drum in cross-section. Fig. 5 is an elevation of the said ring. Fig. 6 is a cross-section through the drum with the packing-ring mounted upon its axis. Fig. 7 is a modification of the arrangement shown in Fig. 6. Fig. 8 is a section through the spring-governor on the line $z\,z$ of Fig. 1. Figs. 9 to 12 are views of the distributing-surfaces in development.

The machine consists of two main parts—that is to say, of the cylinder with rotary piston occupying the left-hand half of the drawing in Fig. 1 and of the steam-turbine occupying the right-hand half of Fig. 1. The piston $a$ of the rotary motor is rigidly connected with the main driving-shaft $b$. Upon this latter is also rigidly mounted the turbine $c$, so that both parts of the machine rotate in rigid connection with each other.

Fig. 2 shows the piston $a$ and the drum $d$, in which the flat portion of the piston is displaced during the rotation, a packing $e$ being provided. As stated above, the piston is connected with the shaft $b$. The drum $d$ is pivoted at $f$ at a certain distance below the main shaft $b$, so that upon the rotation of the piston $a$ with the shaft $b$ the drum $d$ is caused to rotate around the pivot $f$, which is mounted eccentrically thereto. The drum $d$, the interior of which is in communication with a hermetically-closed space, is provided with an aperture which is closed in a steam-tight manner by means of packing $e$. As this packing member $e$ is of cylindrical form, it is able to rotate in the aperture of the drum. Through this packing member passes the piston $a$, and in order to insure as great tightness as possible adjustable bushes $e'$ are provided upon both sides of the piston. The piston $a$ thus passes steam-tight through the packing member $e$ and is displaced within this latter during the rotation.

The cylinder $h$, in which the piston, with its drum, rotates, is supplied with steam through an opening $i$, while the used steam escapes through a passage $i'$, arranged upon the opposite side. In order to render the space in front of and behind the piston steam-tight and at the same time to reduce the friction to a minimum, the rotating drum is packed by means of a fillet $k$ in proximity to the steam-admission aperture $i$ where it enters the wall of the cylinder. This fillet is rigidly connected with a ring $k'\,k^2$, Figs. 4 and 5, which surrounds the drum and consists of two halves $k'\,k^2$, so that it is capable of adjustment. These two halves are connected one with the other by means of screws $k^3$. (See Fig. 5.) The fillet $k$ itself is connected with the horizontal flange $k^8$ of the lower half $k'$ of the ring. This flange $k^8$ rests in a cylindrical part $k^4$, which lies on a recess in the casing $p$. In order to obtain close but frictionless contact between the fillet $k$ and the drum, thin metal plates $k^5$ are arranged beneath the fillet $k$ in the horizontal flange of the part $k'$. According to the number of these metal plates or strips the bar $k$ may be brought into more or less intimate contact with the drum without, however, producing any considerable friction. In order that the bar may invariably retain its proper position with respect to the drum, the ring $k'$ $k^2$, connected with the said bar, is placed around the drum, as already stated. It does not participate in the rotation of the drum, but effects some lateral movement with this latter.

Instead of placing the ring $k'$ $k^2$ around the drum, as shown in Figs. 1 and 2, it may also, as shown in Fig. 6, be inserted in a special mortise $d'$, formed in the drum $d$. In this case the ring consists of a kind of socket $k^9$, which is connected with an arm $k^6$.

In Fig. 7 a modification is shown, in which the ring $k'$ engages on the shaft $f$ of the drum $d$ by means of a sleeve $k^7$.

For the purpose of balancing the piston $a$ it is provided with a counterweight $a'$, Fig. 2. This latter is made of semicircular form in order that the weight may not strike against the inner side of the drum $d$. The piston is also provided with a number of apertures $a^2$, which gradually become smaller from the outer end toward the middle point. These perforations serve to decrease the weight of the piston to the greatest possible extent without prejudicially affecting its rigidity. The size and number of the apertures should be calculated in the same manner as would be done in the case of a girder of similar strength. In order to render the weight of the piston as nearly as possible the same as that of the counterweight, care must be taken that the centers of gravity are situated at a corresponding distance from the point of oscillation.

The shaft $f$ is mounted in the cover $l$ of the machine, Fig. 1, which is closed by means of a special disk $l'$. In this cover the rear wall $m$ of the cylinder also engages, against the front face of which the piston $a$ and drum bear. The other face against which the piston and the drum lie is formed by the casing. In order to exactly arrive at the interval between the two faces, so that the piston and the drum are displaced in a steam-tight manner between the same without experiencing undue friction, this rear wall $m$ is packed by means of intermediate layers $n$ of thin metal strips between the cover $l$, and similar strips $n'$ are arranged against the cylinder-casing $p$. If the piston and the drum have become somewhat worn upon the two flat surfaces, adjustment may be effected either by removing some of the metal strips $n'$ to $n$ or by supplying additional strips.

The main shaft $b$ passes through the cover $l^2$, (on the right-hand side of Fig. 1,) which closes the casing $p$. In the chamber formed between this cover $l^2$ and the partition $p^2$ of the casing are arranged the turbine $c$ and the distributing-gear. The turbine $c$ is provided with chambers or cells $c'$ in the ordinary manner, Fig. 3, against which the fresh steam entering through the aperture $o'$ strikes, thus causing the turbine to rotate. The steam then passes between the periphery of the turbine and the inclosing casing into the steam-chamber $p^3$, where the distributing-gear is situated. This distributing-gear consists of two cylindrical sleeves $q$ and $q'$, exactly fitting one within the other. The outer sleeve $q'$ works steam-tight in the cylindrical recess in the casing. From this recess $p^4$ leads the inlet-passage $i$ for the cylinder $h$, by means of which the piston $a$ is caused to rotate. In order to permit of causing varying quantities of steam to enter the cylinder, the steam-passages $i^2$ and $i^3$ must be capable of mutual adjustment by means of the sleeves $q$ and $q'$, so that when necessary the piston may be driven with full steam or with expansion. In order to effect this, the arrangement is as follows: Upon the main shaft $b$ is mounted a driving-ring $r$, two arms upon which engage in the inner steam-distributing sleeve $q$ and upon rotating drive this latter. Two arms of a second driving-ring $r'$ also engage in this sleeve $q$. The hub $r^2$ of this second driver $r'$ is connected with a sleeve $b^2$, which is capable of rotation, but not of longitudinal displacement, upon the shaft $b$. The tenons upon the driver $r'$ engage in oblique slots $s$ in the steam-distributing sleeve $q$. When, therefore, the driver $r'$ rotates against the driver $r$, the sleeve $q$ is displaced parallel with the center of the shaft. Obviously the tenons of the driver must permit of such a displacement, and consequently the corresponding openings in the sleeve $q$, in which the tenons of the driver $r$ engage, are made of suitable form.

Figure 9:
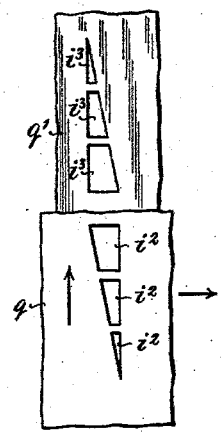
Figure 10:
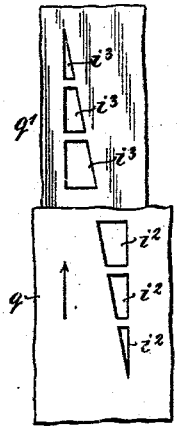
Figure 11:
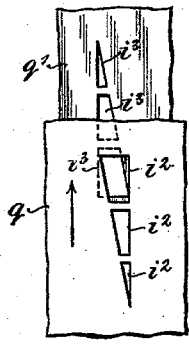
Figure 12:
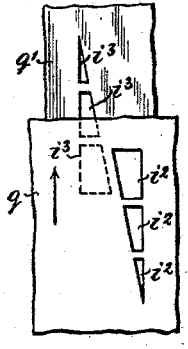

The steam-passages $i^2$ in the sleeve $q$ are of triangular or of triangular and trapezium shape, as are also the openings in the sleeve $q'$, according as it is desired to obtain a large or small feed. Figs. 9 and 10 show the faces of the two sleeves $q$ and $q'$ flat or in development. The sleeve $q'$ remains stationary unless displaced by hand in the manner hereinafter explained. The sleeve $q$, on the contrary, is caused to constantly rotate by the main shaft and is at the same time displaced laterally by the governor. Figs. 11 and 12 show the relative positions of $q$ and $q'$ after the part $q$ has partly moved over the part $q'$.

If full steam is to enter the cylinder at the commencement of working, the positions of $q$ and $q'$ will be as shown in Figs. 9 and 11. When the machine has attained its full velocity, the parts $q$ and $q'$ should occupy the positions shown in Figs. 10 and 12. In the intermediate position the sleeve $q$ is displaced laterally by the governor and the steam-admission apertures are rendered larger or smaller, so that the necessary expansion is produced.

The governor is arranged within the body of the turbine. It consists, essentially, of two cylindrical hollow bodies $u$ $u'$, which are displaced in the manner of pistons in corresponding recesses in the body $c$ of the turbine. Spiral springs $v$ $v'$ press these pistons inward, while during the rotation centrifugal force tends to force them outward. The springs bear against closing-plates $v^2$. Toothed rods $u^2$ are connected with the pistons and engage with a toothed wheel $u^3$ common to them both. This wheel is mounted upon the sleeve $b^2$, which, as previously explained, is capable of displacement but not of a movement of translation upon the shaft $b$ and which carries the drivers $r'\ r^2$. It is therefore obvious that when owing to centrifugal force the pistons $u\ u'$ are forced outward the sleeve $b^2$ will rotate upon the shaft $b$, thus displacing the steam-admission sleeve $c$, so that a smaller quantity of steam can enter the cylinder through the steam-passage $i$. In order to permit of regulating the expansion by hand independently of this automatic adjustment of the steam-admission aperture, a second sleeve $q'$ is mounted upon the socket $q$, and this second sleeve is also provided with triangular or trapezium shaped steam-passages $i^3$. This second sleeve $q'$ may be displaced by means of a lever $w$, operated from outside by the intermediary of a rod $w'$ and handle $w^2$, Figs. 1 and 3. Instead of this lever $w$ any convenient means may be employed for this purpose—such, for example, as a short toothed rod on the sleeve $q'$ and a toothed segment on the rod $w'$.

For the purpose of protecting the shaft $b$ from axial pressure upon one side there is provided upon the shaft a fillet $b^3$, which is situated in a recess, Fig. 1, that side of this latter to the left hand of the fillet being in communication with the atmosphere by means of a passage $b^4$, while the right-hand side communicates, by means of a passage $b^5$, which passes through the middle of the shaft $b$, with the hermetically-closed steam-chamber within the drum. The fillet $b^3$ is therefore exposed to different pressures upon each side, and by making this fillet of suitable size it is possible to equalize the pressure upon either side in such a manner that the shaft $b$ works without lateral pressure in the drum $d$ under varying pressures.

What I claim, and desire to secure by Letters Patent of the United States, is—

1. A rotary engine comprising a casing, a piston arranged to rotate in said casing, a drum surrounding said piston and arranged to rotate therewith, a ring adjacent to said drum, and a bar connected with said ring and forming a steam-tight joint with said drum.

2. A rotary engine comprising a casing, a piston arranged to rotate in said casing, a drum surrounding said piston and arranged to rotate therewith, a ring adjacent to said drum, a bar connected with said ring and forming a steam-tight joint with said drum, and a plurality of metallic strips for effecting adjustment of said bar.

3. A rotary engine comprising a casing, a piston arranged to rotate in said casing, a drum surrounding said piston and arranged to rotate therewith, and a sleeve having trapezium-shaped apertures therein for controlling the supply of steam to said piston.

4. A rotary engine comprising a casing, a piston arranged to rotate in said casing, a drum surrounding said piston and arranged to rotate therewith, a pair of perforated sleeves for controlling the supply of steam to said piston, and automatic means for regulating said sleeves.

5. A rotary engine comprising a casing, a piston arranged to rotate in said casing, a drum surrounding said piston and arranged to rotate therewith, a pair of sleeves each having trapezium-shaped apertures therein and one surrounding the other, and automatic means for regulating the movement of said sleeves.

6. A rotary engine comprising a casing, a shaft in said casing, a piston on said shaft adapted to rotate in said casing, a drum surrounding said piston and arranged to rotate therewith, a turbine on said shaft, a pair of perforated sleeves for controlling the supply of steam to said piston, and automatic means controlled by said turbine for regulating said sleeves.

7. A rotary engine comprising a casing, a pair of steam-chambers in said casing, a shaft, a turbine on said shaft operating in one of said steam-chambers, a rotary piston on said shaft in the other of said steam-chambers, a drum surrounding said piston and arranged to rotate therewith, a passage between said steam-chambers, a pair of perforated sleeves controlling said passage, and means for regulating said sleeves.

8. A rotary engine comprising a casing, a pair of steam-chambers in said casing, a shaft, a turbine on said shaft operating in one of said steam-chambers, a rotary piston on said shaft in the other of said steam-chambers, a drum surrounding said piston and arranged to rotate therewith, a passage between said steam-chambers, a pair of perforated sleeves controlling said passage, and automatic means controlled by said turbine for regulating said sleeves.

9. A rotary engine comprising a casing, a pair of steam-chambers in said casing, a shaft, a turbine on said shaft in one of said steam-chambers, a rotary balanced piston on said shaft in the other of said steam-chambers, a drum surrounding said piston and arranged to rotate therewith, a passage connecting said steam-chambers, means controlled by said turbine for regulating said passage, a sleeve surrounding said shaft and connected with said casing, said sleeve having a chamber therein, a collar on said shaft arranged within the chamber in said sleeve, a communication between the interior of said casing and one side of the chamber in said sleeve, and a communication between the opposite side of the chamber in said sleeve and the atmosphere.

10. An engine comprising a pair of chambers, a rotary piston in one of said chambers, a turbine in the other of said chambers, a passage connecting said chambers, and perforated sleeves for controlling said passage.

11. An engine comprising a pair of chambers, a rotary piston in one of said chambers, a turbine in the other of said chambers, a passage connecting said chambers, and automatically-operated perforated sleeves for controlling said passage.

12. An engine comprising a pair of chambers, a rotary piston in one of said chambers, a turbine in the other of said chambers, a passage connecting said chambers, and perforated sleeves, operated by said turbine for controlling said passage.

In testimony whereof I have hereunto set my hand, in presence of two subscribing witnesses, this 7th day of July, 1902.

ARTHUR PATSCHKE.

Witnesses:
PETER LIEBER,
WM. ESSENWEIN.